United States Patent [19]

Keller

[11] 3,778,676

[45] Dec. 11, 1973

[54] CONTROL APPARATUS FOR SELECTIVELY ILLUMINATING A GROUP OF LAMPS

[76] Inventor: John M. Keller, 7918 Roosevelt Blvd., Philadelphia, Pa. 19152

[22] Filed: June 7, 1971

[21] Appl. No.: 150,314

[52] U.S. Cl. .................. 315/217, 315/226, 315/318

[51] Int. Cl. .......................................... H05b 37/02

[58] Field of Search ............................ 340/334, 338; 40/106.52; 315/217, 226, 323, 318

[56] References Cited

UNITED STATES PATENTS

| | | | |
|---|---|---|---|
| 3,384,888 | 5/1968 | Harnden, Jr. et al. | 340/339 |
| 3,493,956 | 2/1970 | Andrews et al. | 340/334 |
| 3,573,790 | 4/1971 | Schulenburg, Sr. | 340/334 |

*Primary Examiner*—Palmer C. Demeo
*Attorney*—Seidel, Gonda and Goldhammer

[57] ABSTRACT

Control apparatus associated with a group of three lamps selectively illuminates the lamps in predetermined sequences, there being a mode in which the sequence creates an illusion in the eye of an observer of a moving light spot surrounded by darkness, and a mode in which it appears that a moving dark spot is surrounded by light. The apparatus includes a three-state combinational switching circuit having one input which controls the illumination of one lamp; the two other outputs of the circuit, together with a two-state control switch, establish the state of a four element switching network which in turn controls the illumination of the other two lamps. Complementing the states of the combinational switching circuit changes the mode of operation; and changing the state of the control switch reverses the direction of apparent movement.

12 Claims, 3 Drawing Figures

| LINE | FF 3 | Q3 | $\overline{Q3}$ | SW B | SW C | SW D | FF 2 | FF 1 | Q2 | $\overline{Q2}$ | Q1 | $\overline{Q1}$ | OUTPUTS X | Z | Y | SWITCHES I | II | III | IV | V | VI | VII | LAMPS LIT L1 | L2 | L3 |
|---|---|---|---|---|---|---|---|---|---|---|---|---|---|---|---|---|---|---|---|---|---|---|---|---|---|
| 1 | 1 | 1 | 0 | 1 | 0 | 0 | 0 | 1 | 0 | 1 | 1 | 0 | 0 | 0 | 1 | 0 | 0 | 0 | 1 | 0 | 1 | 0 | – | – | X |
| 2 | 1 | 1 | 0 | 1 | 0 | 0 | 1 | 1 | 1 | 0 | 1 | 0 | 1 | 0 | 0 | 0 | 0 | 0 | 0 | 0 | 1 | 1 | X | – | – |
| 3 | 1 | 1 | 0 | 1 | 0 | 0 | 1 | 0 | 1 | 0 | 0 | 1 | 0 | 1 | 0 | 0 | 1 | 0 | 0 | 0 | 1 | 0 | – | X | – |
| 4 | 1 | 1 | 0 | 1 | 0 | 0 | 0 | 1 | 0 | 1 | 1 | 0 | 0 | 0 | 1 | 0 | 0 | 0 | 1 | 0 | 1 | 0 | – | – | X |
| 5 | 1 | 1 | 0 | 1 | 0 | 0 | 1 | 1 | 1 | 0 | 1 | 0 | 1 | 0 | 0 | 0 | 0 | 0 | 0 | 0 | 1 | 1 | X | – | – |
| | | | | | | | | | | | | | | | | | | | | | | | | | |
| 6 | 0 | 0 | 1 | 1 | 0 | 0 | 0 | 1 | 0 | 1 | 1 | 0 | 0 | 0 | 1 | 1 | 0 | 0 | 0 | 1 | 0 | 0 | – | X | – |
| 7 | 0 | 0 | 1 | 1 | 0 | 0 | 1 | 1 | 1 | 0 | 1 | 0 | 1 | 0 | 0 | 0 | 0 | 0 | 0 | 1 | 0 | 1 | X | – | – |
| 8 | 0 | 0 | 1 | 1 | 0 | 0 | 1 | 0 | 1 | 0 | 0 | 1 | 0 | 1 | 0 | 0 | 0 | 1 | 0 | 1 | 0 | 0 | – | – | X |
| 9 | 0 | 0 | 1 | 1 | 0 | 0 | 0 | 1 | 0 | 1 | 1 | 0 | 0 | 0 | 1 | 1 | 0 | 0 | 0 | 1 | 0 | 0 | – | X | – |
| 10 | 0 | 0 | 1 | 1 | 0 | 0 | 1 | 1 | 1 | 0 | 1 | 0 | 1 | 0 | 0 | 0 | 0 | 0 | 0 | 1 | 0 | 1 | X | – | – |
| | | | | | | | | | | | | | | | | | | | | | | | | | |
| 11 | 1 | 1 | 0 | 0 | 1 | 1 | 0 | 1 | 0 | 1 | 1 | 0 | 1 | 1 | 0 | 0 | 1 | 0 | 0 | 0 | 1 | 1 | X | X | – |
| 12 | 1 | 1 | 0 | 0 | 1 | 1 | 1 | 1 | 1 | 0 | 1 | 0 | 0 | 1 | 1 | 0 | 1 | 0 | 1 | 0 | 1 | 0 | – | X | X |
| 13 | 1 | 1 | 0 | 0 | 1 | 1 | 1 | 0 | 1 | 0 | 0 | 1 | 1 | 0 | 1 | 0 | 0 | 0 | 1 | 0 | 1 | 1 | X | – | X |
| 14 | 1 | 1 | 0 | 0 | 1 | 1 | 0 | 1 | 0 | 1 | 1 | 0 | 1 | 1 | 0 | 0 | 1 | 0 | 0 | 0 | 1 | 1 | X | X | – |
| 15 | 1 | 1 | 0 | 0 | 1 | 1 | 1 | 1 | 1 | 0 | 1 | 0 | 0 | 1 | 1 | 0 | 1 | 0 | 1 | 0 | 1 | 0 | – | X | X |
| | | | | | | | | | | | | | | | | | | | | | | | | | |
| 16 | 0 | 0 | 1 | 0 | 1 | 1 | 0 | 1 | 0 | 1 | 1 | 0 | 1 | 1 | 0 | 0 | 0 | 1 | 0 | 1 | 0 | 1 | X | – | X |
| 17 | 0 | 0 | 1 | 0 | 1 | 1 | 1 | 1 | 1 | 0 | 1 | 0 | 0 | 1 | 1 | 1 | 0 | 1 | 0 | 1 | 0 | 0 | – | X | X |
| 18 | 0 | 0 | 1 | 0 | 1 | 1 | 1 | 0 | 1 | 0 | 0 | 1 | 1 | 0 | 1 | 1 | 0 | 0 | 0 | 1 | 0 | 1 | X | X | – |
| 19 | 0 | 0 | 1 | 0 | 1 | 1 | 0 | 1 | 0 | 1 | 1 | 0 | 1 | 1 | 0 | 0 | 0 | 1 | 0 | 1 | 0 | 1 | X | – | X |
| 20 | 0 | 0 | 1 | 0 | 1 | 1 | 1 | 1 | 1 | 0 | 1 | 0 | 0 | 1 | 1 | 1 | 0 | 1 | 0 | 1 | 0 | 0 | – | X | X |

TIME ↓

INVENTOR
JOHN M. KELLER

BY

Seidel, Gonda & Goldhammer
ATTORNEYS

INVENTOR
JOHN M. KELLER
BY
Seidel, Gonda & Goldhammer
ATTORNEYS

CONTROL APPARATUS FOR SELECTIVELY ILLUMINATING A GROUP OF LAMPS

DETAILED DESCRIPTION

This invention is concerned with apparatus for selectively illuminating a series of lamps to create the illusion of movement.

Lighted advertising displays attract the attention of observers by employing chains of lamps arranged in groups in which the lamps are sequentially flashed on and off in such a way as to create an illusion of movement. In one mode of operation, only one lamp in each group of lamps is lit at any instant of time; and the illusion of movement is created by sequentially illuminating the lamps in each group such that a lighted spot appears to move along the chain in the direction in which the lamps in each group are sequentially illuminated. In another mode of operation, all except one lamp in each group is illuminated; and the illusion of movement is created by sequentially turning off the lamps in each group such that a dark spot appears to move along the chain in the direction in which the lamps are sequentially turned off.

A conventional approach to achieving the desired sequence of illumination employs a deck of a rotatable switch for each group of lamps in the chain. Rotation of the contact arm on a deck opens or closes the contact of the deck and turns the lamps on or off to establish the mode of operation. The direction of rotation of the arm establishes the direction of apparent movement. To achieve a predetermined pattern of reversals of direction, it is conventional to periodically reverse the drive applied to the contact arms of the decks of switches.

A major problem with this approach is the deterioration of the contacts due to arcing associated with making and breaking each contact, and the complexity of the equipment needed to achieve the desired reversal of rotation of the contact arm. Improved performance is achieved when solid-state switches are used to replace the mechanical contacts; and it is the primary object of the present invention to provide new and improved solid-state control apparatus which achieves both modes of operation and which can easily alter the direction of apparent movement.

Briefly, the present invention utilizes a combinational switching circuit having a plurality of states controlling the operation of switching network means associated with the lamps. Preselected ones of the lamps are illuminated in a preselected manner dependent at least in part on the states of the switching circuit. Specifically, the switching circuit has three-states defined by the states of three outputs. One output directly controls the illumination of one lamp, and two other outputs, together with a two-state control switch, establish the state of a four element switching network. The switching network controls the illumination of the other two lamps. Complementing the outputs of the combinational switching circuit changes the mode of operation; and changing the state of the control switch reverses the direction of apparent movement.

The invention, both as to its organization and method of operation, together with further objects and advantages thereof, may best be understood by reference to the following description taken in connection with the accompanying drawings, wherein like parts in each of the several figures are identified by the same reference character and wherein.

Figures 1, 2:
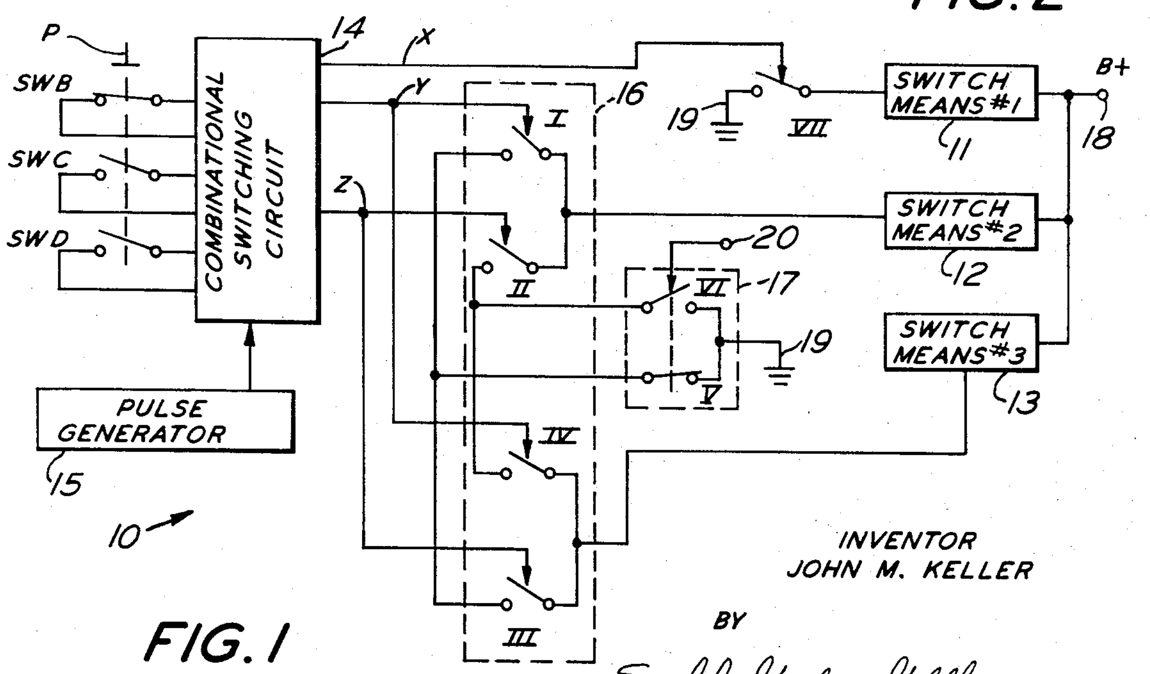
FIG. 1 is a simplified block diagram illustrating the major components of the invention.
FIG. 2 is a truth table chart illustrating the states of the various elements that make up the circuit of the invention.

Referring now to FIG. 1, reference numeral 10 designates the control apparatus for selectively illuminating three lamps in any one of four predetermined sequences. Control apparatus 10 comprises a plurality of actuatable switch means 11, 12 and 13; combinational switching circuit 14; pulse generator 15; switching network 16 and direction control means 17. A lamp (not shown) is associated with each of switch means 11, 12 and 13 arranged so that the lamp is illuminated upon actuation of the switch means with which it is associated. Circuit 14 has three distinct states as established by the states of its three outputs: X, Y and Z. Pulse generator 15 produces periodic clock pulses and applies them to the input of circuit 14 which responds to each clock pulse by changing state. The clock pulses repetitively cycle circuit 14 through all of its states. Switch means 11 is responsive to the state of output X of circuit 14. In particular, the state of output X establishes the state of two-state switch VII which is schematically shown in FIG. 1 as a mechanical switch that is normally open. When switch VII is closed, a circuit is completed between the "plus" side 18 of the power supply for the control apparatus and the power supply ground 19 causing the actuation of switch means 11. Such actuation causes the lamp associated with this switch means to be illuminated.

Switching network 16 includes a first bank of two switches I and II associated, respectively, with outputs Y and Z of circuit 14, and a second bank of two switches III and IV associated, respectively, with the same two outputs. One side of each switch in each bank is connected to a respective one of switch means 12 and 13. The other side of one switch in the first bank (I) is connected to the other side of one switch (III) in the second bank and to one side of one (V) of the two switches of direction control means 17. The other side of the other switch in the first bank (II) is connected to the other side of the other switch in the second bank (IV) and to one side of the other switch (VI) in control means 17. The other side of the two switches in means 17 are connected together and to the power supply ground 19.

All of the switches in network 16 are normally open; the state of switches I and IV is determined, in part, by the state of output Y of circuit 14, and the state of means 17. The state of switches II and III of network 16 is determined, in part, by the state of output Z, and the state of means 17. Switches V and VI of means 17 operate together in that one is closed when the other is open. The state of control means 17 is determined by direction selector 20.

Associated with circuit 14 is mode control switch P which has two states. Complementing switch P results in complementing the outputs X, Y, Z of circuit 14.

Only when the logical output of output X is ONE, will switch VII be closed and switch means 11 actuated, causing the lamp associated therewith to be illuminated. When a logical ONE appears at output Y, either switch I or IV will be closed depending upon the state of control means 17. If such means has the state shown in FIG. 1 (e.g., switch V closed and switch VI open), a logical ONE at output Y will cause switch I of the switching network to close thus actuating means 12; and switch VI will remain open thus preventing actuation of means 13. If the state of control means 17 were reversed, the closing of the previously mentioned switches would be reversed.

When a logical ONE appears at the output Z of switching circuit 14, either switch II or III of network 16 will be closed depending upon the state of control means 17. If switch V of means 17 is closed as shown in FIG. 1, a logical ONE appearing on output Z will cause switch III of the switching network to close thus actuating means 13. If the state of switch 17 were reversed, a logical ONE on output Z would cause switch IV to be closed.

From the above description, it can be seen that, at any instant in time, the actuation of switch 11 will be dependent upon the logical state of output X of circuit 14. On the other hand, the actuation of switch means 12 and 13 will depend not only upon logical state of the outputs Y and Z of circuit 14, but also upon the state of means 17. Furthermore, when means 17 has a given state, the actuation of switch means 11, 12 and 13 will depend upon the manner in which the state of circuit 14 changes in response to the application of clock pulses from pulse generator 15. For example, assume that the state of circuit 14, as determined by outputs XYZ, is 010, and the state of means 17, as determined by the states of switches V and VI, is 10. In such case, switch VII will be open because the logical value of the output X of circuit 14 is ZERO. As a result, switch means 11 will not be actuated; and the lamp associated with the switch means would thus remain dark. Because the logical output at Y is ONE and switch V is closed, switch I will be closed thus permitting switch means 12 to be actuated, and the lamp associated with this switch means to be illuminated. Switch IV, however, will not be closed because switch VI remains open. Because the output at Z of circuit 14 is a logical ZERO switch III of network 16 will not be closed even though switch V of switch 17 is closed. Swtiches III and IV will thus remain open causing switch means 13 to remain unactuated, and the lamp associated therewith will remain dark. In summary, when the state of circuit 14 as determined by the outputs XYZ is 010, and the state of means 17 as determined by switches V and VI is 10, switch VII will be open and only switch I of network 16 will be closed. As a consequence, only switch means 12 of the three switch means will be actuated; and only the middle lamp of the three groups of lamps will be lit.

If means 17 is complemented so that its status determined by switches V and VI is 01 (which is to say that switch VI is closed and V is open), only switch means 13 of the three switch means will be actuated. Switch means 11 will not be actuated because the state of output X is ZERO. Switch means 12 will not be actuated because switches I and II of network 16 will be open. Switch I will be open even through the logical state of output Y is ONE because switch V of means 17 will be open. Switch means 13 will be actuated because switch IV of network 16 will be closed because the logical output of Y is ONE and switch VI is closed.

If the mode control switch P associated with circuit 14 is depressed to change the state of this switch as determined by switches B, C and D from 100 as shown in FIG. 1 to the state 011, the state of circuit 14 will be changed from 010 to 101. In the same manner as described above, tracing of the circuitry shown in FIG. 1 when the state of means 17 as determined by switches V and VI is 10 will show that switch means 11 and 13 will be actuated and switch means 12 will be unactuated. Thus, complementing the state of circuit 14 serves to complement the state of switch means 11, 12 and 13. If means 17 is complemented to state 01, switch means 11 and 12 will be actuated and switch means 13 will remain unactuated.

To appreciate the dynamic response of the control apparatus shown in FIG. 10, as a consequence of the changes of state of circuit 14 resulting from clock pulses produced by generator 15, reference should be made to the chart shown in FIG. 2. When the state of mode control switch P as determined by switches B, C and D is 100, pulses from generator 15 cause circuit 14 to sequentially switch states as follows: 010, 100, 001, 010, 100, etc. as shown in lines 1–10 of the chart. When the state of means 17 as determined by switches V and VI is 01 as shown in lines 1–5 of the chart, only one of the three switch means will be actuated at a time. The sequence of actuation of the switch means as circuit 14 cycles through its various states will be in the direction from top to bottom in FIG. 1. That is to say, the actuation of switch means 11, 12 and 13 will progress from 11 to 13 and then repeat again. On the other hand, if the state of means 17 is 10, as shown in lines 6–10 of the chart, the three switch means will be actuated in the opposite direction. That is to say, switch means 13 will be actuated, then switch means 12, then switch means 11, then switch means 13, etc. The progression will be from bottom to top in FIG. 1.

When the mode control switch is complemented, and has the state 011, the states of circuit 14 will be complemented. In such case, the states of circuit 14 will be as follows: 101, 011, 110, 101, 011, etc., as shown in lines 11-20 of the chart. With means 17 having the state 01, as shown in lines 11–15 of the chart, two of the three switch means will be actuated at any instant of time. As circuit 14 changes states, the unactuated switch means will progress from top to bottom as shown in FIG. 1. Complementing means 17 to the state 10 as shown in lines 16–20 of the chart will still result in having only two of the switch means actuated at any given instant; but the unactuated switch means will appear to progress from bottom to top as shown in FIG. 1 as circuit 14 cycles through its state.

Figure 3:
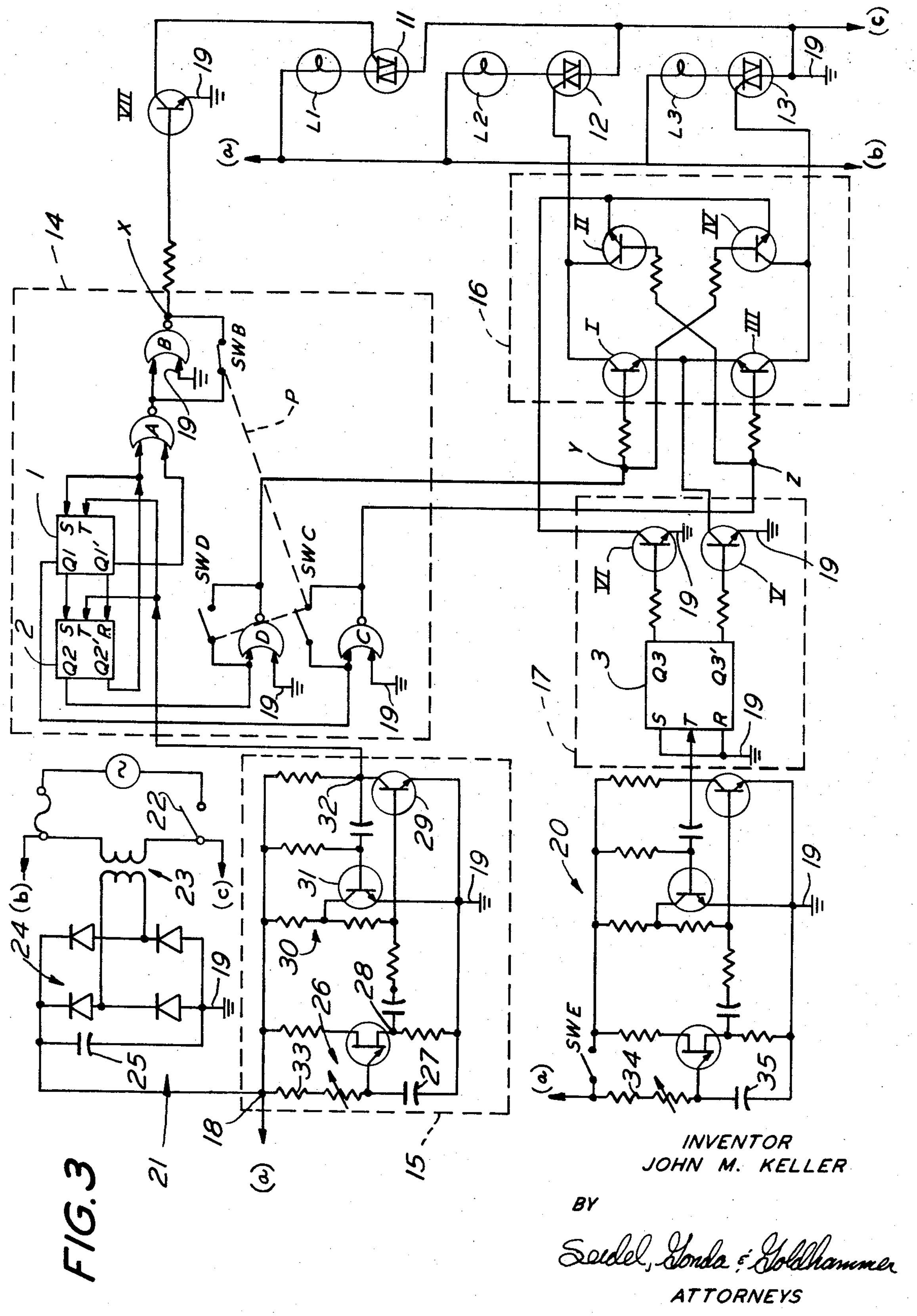
FIG. 3 is a circuit diagram showing the preferred embodiment of the invention.

A complete circuit for achieving the control apparatus illustrated in block diagram form in FIG. 1, is shown in detail in FIG. 3 to which reference is now made. The DC power supply for the logic making up the various elements of the circuit is indicated by reference numeral 21. A 117 V.A.C., 60 Hz. power source is available across terminals (*b*) and (*c*) when "start" switch 22 is closed applying this voltage across the primary of transformer 23. A full wave rectifier 24 associated with the secondary of transformer 23 produces approximately 6 volts D.C. across output capacitor 25 connected between ground 19 and output terminal 18, also designated as terminal (a). When power is available at terminal 18 of pulse generator 15, uni-junction circuit 26 is periodically triggered as capacitor 27 discharges through the lower base resistor of the uni-junction transistor causing the voltage at node 28 to periodically rise relative to ground 19. The periodic positive pulses appearing at node 28 are coupled to the base of transistor 29 which is normally held close to its cutoff level by the bias developed by resistors 30 in combination with transistor 31. Each time the positive going pulses at node 28 are applied to the base of transistor 29, the transistor conducts heavily lowering the collector voltage at node 32 as current flows through the collector resistor of transistor 29. As a consequence, the voltage at node 32 is a series of pulses that vary from approximately 6 volts to approximately ground voltage.

The period of these pulses is determined by the time constant of uni-junction circuit 26, namely the values of timing resistors 33 and timing capacitor 27. Preferably, the time constant is in the range from about 5 msec. to about 150 msec.

The negative pulses produced by generator 15 are applied to circuit 14 comprising a pair of R-S-T flip-flops 1 and 2 interconnected as shown in FIG. 3, and NOR-gates A, B, C, D, together with their associated shunt switches. By reason of their interconnection, the two flip-flops operate as a modulo-three counter in response to the pulses applied to their toggle inputs. The three states of the counter, as defined by the states of flip-flop 2 and flip-flop 1 are: 01,11, 10,01, etc.

When the state of mode control switch P is 100 as defined by the states of switches B, C and D, the output X of circuit 14 is the output of NOR-gate A; the output Y is the output of NOR-gate D; and the output Z is the output of NOR-gate C. The output of NOR-gate A is Q1·Q2. That is to say, the output of NOR-gate A is a logical ONE when each of the two inputs is a logical ZERO. This situation occurs when the state of the two flip-flops is 11, and a ground condition exists at the outputs Q1′ and Q2′. The output of NOR-gate D is: Q2′·1. This output is a logical ONE when each of the two inputs is a logical ZERO. Since one input to this gate is always a logical ZERO as represented by ground 19, and the other input is Q2, the output of NOR-gate D will be a logical ONE when the state of the two flip-flops is 0*θ*, where *θ* indicates that the state of flip-flop 1 does not matter. The output of NOR-gate C is Q1′ ·1. The output of this gate will be a logical ONE when the state of the two flip-flops is *θ*0. In summary: when switch P has the state 100 as shown in lines 1–10 of the chart, X=Q1·Q2; Y=Q2′; and Z=Q1′.

When the state of switch P is complemented to 011, as shown in lines 11–20 of the chart, inspection of FIG. 3 reveals: X=Q1′30 Q2′; Y=Q2 and Z=Q1. Thus, complementing switch P will cause each output X, Y, and Z to be complemented. Thus, the states of circuit 14, which are defined by the states of its outputs, are similarly complemented.

Circuit 17 comprises a single R–S–T flip-flop 3, each output of which is connected through limiting resistors to the respective bases of transistors V and VI. When flip-flop 3 is in its ONE state, the Q3 terminal has a positive voltage and the Q3′ terminal is at ground level. As a result, the emitter-base junction of transistor VI will be forwardly biased and it will conduct as soon as its collector circuit is completed to a positive voltage level. On the other hand, transistor V will be cut off regardless of whether a positive voltage level appears at its collector. When flip-flop 3 is in its ZERO state, transistor V will be forwardly biased and ready to conduct when a positive voltage level appears at its collector. Similarly, transistor VI will be cut off and will not conduct even when a positive level appears at its collector.

The state of flip-flop 3 can be selectively controlled by the operation of direction selector circuit 20. Circuit 20 is similar in construction to pulse generator 15. The timing resistors 34 and timing capacitor 35 associated with the uni-junction of this circuit has a value which depends upon the interval of time within which it is desired for reversal of the direction of apparent movement to take place. The negative going pulses appearing at the collector of the output transistor of the circuit are applied to the toggle input of flip-flop 3 whenever switch E is closed. When switch E is open, flip-flop 3 is passive and will remain in whatever state it occupied in response to the last negative pulse appearing at its toggle input.

Switch means 11, 12 and 13 are in the form of bilateral triode switches, commonly referred to as Triacs. Each bilateral triode switch in series with its lamp is connected in parallel across A.C. terminals (*b*) and (*c*). In the absence of a positive going gate signal relative to the terminal of the bilateral triode switch connected to the lamp, the switches remain non-conductive and the lamps are not illuminated. The presence of a positive signal on the gate of one of the Triacs will cause it to conduct thus applying A.C. power to the lamp associated with the Triac. The lamp will remain illuminated as long as the gate signal is present.

A logical ONE at output X of circuit 14 is a positive voltage level which, when applied to the base of transistor VII through a limiting resistor, forwardly biases the base-emitter junction permitting current to flow from terminal (a) through lamp L1 and into Triac 11, and into its gate electrode which is connected to the collector of transistor VII. This has the effect of turning on the Triac which is in series with lamp L1 and connected across the A.C. power supply between terminals *b* and *c*. A.C. current is thus permitted to flow through lamp L1 causing it to be illuminated; and lamp 11 will remain illuminated until the logical value at output X is switched to ZERO.

applies logical ONE appearing at output Y of circuit 14 applis a positive voltage level through limiting resistors to the bases of transistors I and IV whose emitters are connected respectively to the collectors of transistors V and VI. When the state of means 17, as determined by the states of transistors V and VI is 01 (e.g., when flip-flop 3 is in its ONE state), transistor VI will be forwardly biased and ready to conduct, but transistor V will be cut-off. In such case, transistor IV and VI will conduct, but transistor I will not conduct. Conduction of transistor IV will permit current to flow from terminal (a) through lamp L3 and Triac 13 into its gate electrode which is connected to the collector of transistor IV. As a consequence, Triac 13 will conduct causing A.C. current to illuminate lamp L3.

When direction control means 17 is complemented (e.g., when flip-flop 3 is in its ZERO state), transistor V will be forwardly biased and ready to conduct, but transistor VI will be cut off. In this case, a logical ONE appearing at output Y of circuit 14 causes transistors I and V to conduct, but transistor IV will not conduct. Conduction of transistor I will permit current to flow from terminal (a) through lamp L2 and Triac 12 into the gate electrode on this Triac which is connected to the collector of transistor I. As a consequence, Triac 12 will conduct, and A.C. current will flow through lamp L2 causing it to be illuminated. It should be noted that, as between lamps L2 and L3, L2 will be illuminated when a logical ONE appears at output Y and flip-flop 3 is in its ZERO state. Lamp L3 will be illuminated when a logical One appears at output Y and flip-flop 3 is in its ONE state.

A logical ZERO appearing at output Y at circuit 14 has the effect of applying a ground potential to the bases of each of transistors I and IV with the result that these transistors cannot conduct regardless of the states of transistors V and VI.

A logical ONE appearing at output Z of circuit 14 applies a positive voltage level through limiting resistors to the bases of transistors II and III whose emitters are connected respectively to the collectors of transistors VI and V. When the state of means 17, as determined by the states of transistors of V and VI, is 01 (e.g., when flip-flop 3 is in its ONE state), transistors II and VI will conduct, but transistor III will not conduct. Conduction of transistor II will permit current to flow from terminal (a) through lamp L2 and Triac 12 into the gate electrode of this Triac which is connected to the collector of transistor II. As a consequence, Triac 12 will conduct, and A.C. current will flow through lamp L2 causing it to be illuminated.

When means 17 is complemented and flip-flop 3 is in its ZERO state, a logical ONE apearing at output Z causes transistors III and V to conduct; but transistor II will not conduct because transistor VI is cut-off by reason of the grounding of its base. Conduction of transistor III will permit current to flow from terminal (a) through lamp L3 and Triac 13 into the gate electrode of this Triac which is connected to the collector of transistor III. As a consequence, Triac 13 will conduct, and A.C. current will flow through lamp L3 causing it to be illuminated. As between lamps L2 and L3, lamp L2 will be illuminated when a logical ONE appears at output Z and flip-flop 3 is in its ONE state; but lamp L3 will be illuminated when flip-flop 3 is in its ZERO state.

When the desired mode of operation of the lamps requires a moving light spot, and the direction of apparent movement of the light spot is to be in the forward direction (e.g., L1, L2, L3, L1, etc.) switch E should be open and flip-flop 3 should be in its ONE state. Mode control switch P should be in its 100 state (e.g., switch B closed and switches C and D open). When start switch 22 is closed with the above described initial conditions, the states of the various elements shown in FIG. 3 will occur in the sequence shown in lines 1–5 of chart 2 in response to periodic pulses produced by generator 15. As shown in lines 2–4 of this chart, one lamp of the three lamps will be lit at a time, and the sequence of lighting will be from 1–3.

When the desired mode of operation requires a moving dark spot, and the direction of movement of the dark spot is to be in the forward direction, flip-flop 3 should be its ONE state but mode control switch P should be in its 011 state (e.g., switch B open and switches C and D closed). The states of the various elements in FIG. 3 will change as shown in lines 11–15 of chart 2 in response to the application of pulses from generator 15 to circuit 14. In this situation, two of the three lamps will be lit at any instant of time. The lamp that is not illuminated will progress in the forward direction from L1 to L3 as generator 15 applies pulses to circuit 14.

When the desired mode of operation requires a moving light spot, and the direction of apparent movement is to be in the reverse direction, switch E should be open, flip-flop 3 should be in its ZERO state, and mode selector switch P should be in its 100 state. The application of pulses from generator 15 to circuit 14 under this condition will produce the changes of state as indicated in lines 6–10 of chart 2. As can be seen from inspection, only one of the three lamps will be illuminated at any instant of time, and the sequence of illumination will be in the reverse direction from L3 to L1.

If the desired mode of operation requires a moving dark spot, and the direction of apparent movement is to be in the reverse direction, flip-flop 3 should be in its ZERO state and mode control switch should be in its 011 state. As shown in lines 16–20 of chart 2, two of the three lamps will be illuminated at all times and the dark lamp will follow the sequence L3, L2, L1, etc.

In the event that periodic reversals of the direction of apparent movement are to occur, switch E shown in FIG. 3 would be closed causing periodic reversals in state of flip-flop 3. Mode selector switch P however still retains control over the selection of the mode of operation of the lights.

The circuit shown in FIGS. 3 thus contains no moving parts except for the starting switch, the mode selector switch P and the reversing switch E. Further versatility can be achieved by providing an electronic switch for mode selector switch P. In such case, it would then be possible to periodically reverse the mode of operation of the lamps as well as to periodically reverse the direction of movement, all without requiring moving parts and mechanical switches.

The present invention can be incorporated into providing, display system comprising many groups of three lamps by pgviding, for each group of lamps, a combinational switching circuit and switching means such as disclosed above. By driving each such switching circuit from a common pulse generator, system synchronization is achieved and the light or dark spot in each group of lamps will appear to move simultaneously. While this specification shows and describes control apparatus for a group of three lamps, the principles of the invention are applicable to groups of more than three lamps.

The present invention may also be embodied in other specific forms without departing from the spirit or essential attributes thereof and, accordingly, reference should be made to the appended claims rather than to the foregoing specification as indicating the scope of the invention.

I claim:

1. Control apparatus comprising:

a predetermined number of actuable switch means;

a pulse generator for producing periodic clock pulses;

a combinational switching circuit having a predetermined number of outputs, each of said predetermined number of outputs providing a first or a second electrical signal state, said predetermined number of outputs providing a plurality of electrical signal states comprised of combinations of the first or second electrical signal state of all of said predetermined number of outputs, said combinational switching circuit including means for counting, said combinational switching circuit receiving the output of said pulse generator and being constructed and arranged to change state in response to each clock pulse by changing the electrical signal state from said first state to said second state or vice versa of at least one of said outputs of said combinational switching circuit, said combinational switching circuit being repetitively cycled through all of its plurality of states in response to the clock pulses; and switching network means associated with said switch means for actuating preselected ones of said switch means in a preselected order in response to the sequence of electrical signal states of the plurality of electrical signal states provided by said predetermined number of outputs of said combinational switching circuit.

2. Control apparatus according to Claim 11 wherein the number of outputs of said combinational switching circuit is the same as the number of said switch means, and wherein said switching network means includes means responsive to one output of said combinational switching circuit for actuating one of said switch means when said one output has a predetermined state, and a switching network associated with the remaining switch means for actuating the latter in response to the states of the other outputs of said combinational switching circuit.

3. Control apparatus according to claim 2 including a two-state control switch, the state of the output of said control switch and the state of said other outputs of said combinational switching circuit being applied as inputs to said switching network, said switching network controlling the actuation of said remaining switch means in respone to the output state of said control switch and the state of said other outputs of said combinational switching circuit.

4. Control apparatus according to claim 3 wherein said switching network includes a plurality of switches operable to cause selective actuation of said remaining switch means, the operation of said switches being controlled in response to the states of said other outputs of said combinational switching circuit and the state of said control switch.

5. Control apparatus according to claim 4 wherein a bank of switches equal in number to the number of said other outputs of said combination switching circuit is associated with each of said remaining switch means, the operation of each switch in a bank being controlled in response to the state of the output of said combinational switching circuit with which the bank is associated.

6. Control apparatus according to claim 2 wherein the number of swich means is three, and said switching network includes a bank of two switches for each of said other outputs and includes two control switches, one side of each switch in a bank being connected to a respective one of said remaining switch means, the other side of each switch in a bank being connected to the other side of each switch in the other bank and to one side of a different one of said two control swtiches, the other side of each control switch being connected together and to an electrical circuit common to said switch means, said control switches being operated together so that one is open but the other is closed, and a control input for establishing the state of said control switches, each switch in a bank being associated with a different one of said other outputs, the operation of each switch being controlled in response to the state of the output with which it is associated and the state of said control switches.

7. Control apparatus in accordance with claim 6 wherein said combinational switching circuit and said switching network is constructed and arranged so that said switch means are operated in a predetermined time sequence.

8. Control apparatus in accordance with claim 7 wherein said combinational switching circuit and said switching network is constructed and arranged so that the sequence of actuation is unidirectional.

9. Control apparatus in accordance with claim 7 wherein said circuit and said switching network is constructed and arranged so that the direction of the sequence of actuation is dependent upon the state of said control switches.

10. Control apparatus in accordance with claim 9 wherein each switch means, when actuated, causes a lamp to be illuminated.

11. Control apparatus in accordance with claim 9 including a flip-flop circuit, the outputs of said flip-flop circuit controlling the state of said control switches, and an oscillator, said oscillator providing a periodic signal to said flip-flop circuit to cause said flip-flop circuit to periodically change state, said control switches periodically changing state in response to said flip-flop circuit changing state thereby periodically reversing the direction of the sequence of actuation of said switch means.

12. Control apparatus in accordance with claim 11 wherein said combinational switching circuit includes an inverter circuit connected in series with each of said predetermined number of outputs and a switch in parallel with each said inverter circuit, said switches being coupled together to operate in unison, said switches being operative to cause the inversion of the output electrical signal states of said combinational switching circuit in order to actuate all of said switch means except preselected ones in a preselected order.

* * * * *